United States Patent [19]

Tobing

[11] Patent Number: 4,931,508
[45] Date of Patent: Jun. 5, 1990

[54] CO-CURING OF NR/EPDM RUBBER BLENDS

[75] Inventor: Singa D. Tobing, Moline, Ill.

[73] Assignee: Servus Rubber Company, Inc., Rock Island, Ill.

[21] Appl. No.: 418,232

[22] Filed: Nov. 16, 1989

Related U.S. Application Data

[63] Continuation of Ser. No. 193,803, May 13, 1988, Pat. No. 4,882,387.

[51] Int. Cl.$^5$ .................... C08L 7/00; C08L 23/16; C08L 23/20
[52] U.S. Cl. .................... 525/194; 525/211; 525/237; 525/345; 524/490; 524/232
[58] Field of Search ............... 525/194, 232, 237, 345

[56] References Cited

U.S. PATENT DOCUMENTS

| | | | |
|---|---|---|---|
| 2,909,584 | 10/1959 | Parks | 525/345 |
| 3,419,639 | 12/1968 | Gentile | 260/889 |
| 3,658,732 | 4/1972 | Ballini et al. | 525/237 |
| 3,817,952 | 6/1974 | Knabeschuk | 525/345 |
| 3,821,134 | 6/1974 | Son et al. | 260/5 |
| 3,830,881 | 8/1974 | Woods et al. | 260/889 |
| 4,051,083 | 9/1977 | Newman | 260/5 |

FOREIGN PATENT DOCUMENTS

| | | | |
|---|---|---|---|
| 244075 | 10/1960 | Australia | 525/194 |
| 171154 | 2/1986 | European Pat. Off. | 525/194 |

OTHER PUBLICATIONS

"Peroxide Cross-Linking . . . ", Van Drumpt, Rubber World 3/88, pp. 33–41.
"Co-Vulcanization in NR/EDPM Blends" Tobing Rubber World—2/88—pp. 33–37.

*Primary Examiner*—Carman J. Seccuro
*Attorney, Agent, or Firm*—Charles G. Lamb

[57] ABSTRACT

NR/EPDM co-cured rubber blends with sulfur and organic peroxide used together as the co-curing agents to achieve ozone resistant, high tensile property rubber compositions. Sulfur accelerators MBTS and DPG are also employed in the curing process. NR/EPDM blends of from 70/30 to 55/45 are cured in an air cure process with sulfur in the range of 0.64–1.6 phr and with organic peroxide in the range of 0.6–1.6 phr.

8 Claims, No Drawings

CO-CURING OF NR/EPDM RUBBER BLENDS

This is a continuation of application Ser. No. 193,803 filed May 13, 1988, now U.S. Pat. No. 4882387.

BACKGROUND OF THE INVENTION

This invention relates to ozone resistant co-cured blends of ethylene propylene diene monomer elastomers (EPDM) dispersed in natural rubber (NR). More specifically, it relates to compositions of the type described which are particularly well adapted to being cured in the presence of oxygen, such as is encountered when curing in an autoclave, and at relatively low temperatures (e.g. 300° F.).

There are many product applications for rubber that require the products to undergo curing in a pressurized air environment such as is typically employed in autoclave curing. Many such products comprise relatively thin layers of rubber material which can also be layered onto other materials, such as fabric or other structural materials that are sensitive to high temperatures, e.g. above 300° F. Typical examples of such products would be rubber protective footwear, waders protective clothing and gloves. Examples of other rubber products (with or without associated temperature sensitive materials) that normally use pressurized air cure would be rubber rollers (especially large articles), large rubber hoses and tire sidewalls.

Natural rubber is particularly desirable for use in products of the type just described because of its inherent tack and good adhesion property in the uncured state, as well as its processability, and also because of its excellent tensile properties and favorable economics. However, natural rubber is known to lack chemical resistance and, in particular, is susceptible to ozone degradation caused by the high unsaturation level in its molecular structure. Ozone generally attacks carbon-carbon double bonds to form ozonide that creates surface cracking. Upon stress, these microscopic cracks become macroscopic which causes undesirable leakage in footwear.

It is known to use additives dispersed in the natural rubber to improve ozone resistance. Wax has been employed to form a protective layer that insulates the rubber surface from ozone attack. However, due to the brittle nature of wax this solution has not been found to be effective when the rubber product is subjected to cyclic stress in use. Alternatively, chemical antiozonants have been developed that bloom to the surface of the rubber and scavenge ozone. These chemical antiozonants increase the critical energy level for crack initiation and thus enhance the ozone resistance of the natural rubber. Unfortunately, the bloom of antiozonants to the rubber surface also introduces adhesion problems that are highly undesirable when products are produced by plying layers of rubber together as is the case with rubber footwear and similar products.

A more recent approach to improving ozone resistance involves the practice of blending natural rubber with ethylene propylene rubber (EPR) to take advantage of the fact that the dispersed EPR particles reduce crack length and increase the critical value of energy for macroscopic cracking. The terpolymer of EPR, ethylene propylene diene monomer (EPDM) rubber, has small pendant unsaturation sites such as ethylene norbornene (ENB), dicyclopentadiene (DCPD), etc., which make the EPDM sulfur curable and allow it to be blended with highly unsaturated elastomers such NR, SBR and NBR. The degree of dispersion of EPDM particles and the molecular weight of EPDM influence the blend's ozone resistance and tensile properties. Blends of 30%–35% EPDM with 70%–65% NR are known to be used to improve ozone resistance. Unfortunately, however, blends of these constituents are also known to suffer from lack of tack (adhesion) property and low tensile strength. Both of these problems are attributed to the low polarity of EPDM and its cure incompatibility with natural rubber. It is known that building tack and processability of NR/EPDM blends can be improved by the addition of small amounts of low molecular weight (liquid-like) EPDM. However, the difficulty in achieving a satisfactory co-cure of the NR and EPDM in the blend still contributes in a major way to resultant blends that exhibit poor tensile strength and poor ozone resistance.

The use of sulfur as a rubber curing (vulcanizing) agent is well known. However, the use of sulfur alone as the curing agent in NR/EPDM blends has been found to be less than fully satisfactory because of the demonstrated preference of sulfur to the NR phase in the curing process which has the effect of leaving the EPDM phase relatively uncured. Surprisingly, however, it has been found that the addition of an organic peroxide as a second curing agent in combination with sulfur improves the co-curability of the NR and EPDM and permits the development of a co-cured NR/EPDM blend with improved ozone resistance while at the same time achieving the desired tensile properties.

Organic peroxide is known to cure equally well with either NR or EPDM. The mechanism of organic peroxide curing is based on the fact that organic peroxide molecules, in general, have thermally unstable oxygen-oxygen bonds in common that, when heated, break and form free radicals that can extract hydrogen atoms from polymer chains. The resultant polymer radicals easily combine to form stable carbon-carbon bonds that greatly exceed crosslink bonds produced by sulfur curing. Unfortunately, however, heating of organic peroxide to produce the free radicals useful for crosslinking purposes is well known to make the peroxide highly susceptible to rapid degradation when exposed to oxygen. As a consequence, it has not generally been considered feasible to use organic peroxide in an air cure system such as is the case with autoclave curing generally used in many non-tire product applications of the type described above. Quite surprisingly, however, it has been discovered, in accordance with a feature of the present invention, that the joint use of sulfur and organic peroxide as co-curing agents in NR/EPDM blends results in excellent co-cure of the NR and EPDM without degradation or decomposition of the organic peroxide even when used in an autoclave air curing type of system. Moreover, it has been found that co-cure of the blend is achieved at moderately low temperature, e.g. 300° F., which makes it particularly attractive in the production of certain built-up rubber items, such as footwear, having structural underlayment materials in them that can be damaged when exposed to temperatures higher than 300° F.

It is therefore an object of the present invention to provide a composition comprised of an NR and EPDM blend that has improved ozone resistance over known NR/EPDM blends. It is a further object of the invention to provide a co-cured NR/EPDM blend that has improved tensile strength over prior art NR/EPDM blends. It is yet a further object of the invention to provide an NR/EPDM blend that is co-curable in an air cure environment such as encountered in autoclave curing and at relatively low temperatures of, for example, 300° F. It is a still further object of the invention to provide a method of producing co-cured NR/EPDM rubber blends in an air environment that exhibit improved ozone resistance and tensile strength properties over prior art air cured blends of this type.

SUMMARY OF THE INVENTION

Thus in accordance with the invention, there is provided a co-cured blend of natural rubber and ethylene propylene diene monomer elastomer containing sulfur and organic peroxide together as the vulcanizing agents. The composition of the invention comprises a co-cured mixture containing, by weight of total rubber, 70-55% natural rubber, 30-45% of an ethylene propylene diene monomer elastomer and, as curing constituents, about 0.64 to 1.6 phr of sulfur, about 0.5 to 1.0 phr of mercaptobenzothiasole disulfide, about 0.3 to 0.6 phr of diphenylguanidine and about 0.6 to 1.2 phr of an organic peroxide. Further in accordance with the invention, there is provided a method of co-curing an NR/EPDM rubber blend comprising the steps of uniformly dispersing EPDM into NR in the weight ratio of total rubber of about 70-55% NR and about 30-45% EPDM, most preferably 60/40 NR/EPDM, blending therewith a curing system containing about 0.64-1.6 phr of sulfur, about 0.6-1.2 phr of organic peroxide, about 0.5-1.0 phr of mercaptobenzothiasole and about 0.3-0.6 phr of diphenylguanidine, and fully curing the rubber blend in an air curing system at a maximum temperature of about 300° F. at a pressure of about 32 psig for about one hour.

DETAILED DESCRIPTION

In the development of many non-tire rubber products, and especially relatively thin sheeted products such as protective clothing, fireman's boots waders, and the like, ozone resistance is a critically important feature to be incorporated into the rubber composition used in the products. The use of NR/EPDM blends is an attractive approach due to the increased crack resistance in the presence of ozone that the EPDM introduces. Unfortunately, however, the difficulty in achieving good co-curing of the NR and EPDM constituents of the blend adversely affects the tensile properties of the resultant cured composition. More specifically, the known preference of sulfur to the NR over the EPDM leaves the EPDM relatively uncured and thus producing a product with poor tensile properties. While it is known that organic peroxide is a good crosslinking curing agent for EPDM, it is also known that such peroxides are somewhat unstable in the presence of oxygen at temperatures normally used during the curing process and, as a consequence, peroxide curing of EPDM has been limited to press curing applications or else complex and costly curing techniques have been employed to overcome the oxygen sensitivity of the peroxide during the curing process.

It has now been found that by using sulfur and organic peroxide together in the curing process along with careful proportioning of the NR/EPDM blend and other constituents of the compound, good co-curing of the NR and EPDM can be achieved, providing substantially improved tensile properties over sulfur cured NR/EPDM blends and that air curing does not have an adverse effect on the ability of the organic peroxide to contribute effectively to the curing of the EPDM.

In carrying out the invention, blends of NR and EPDM are used in the range of about 70-55% NR and about 30-45% EPDM. The use of EPDM in the blend results in some loss of tack (adhesion) property in the uncured blend which can be an important factor particularly in the production of certain rubber products produced by layering thin rubber sheets to build up a desired thickness of the rubber material. This can be ameliorated by the use of a small amount of low molecular weight EPDM mixed in with the high molecular weight EPDM used in the blend. For this purpose, the EPDM is preferably divided between high and low molecular weight (MW) components in the range of about 32/4 high/low MW to about 20/10 high/low MW. High MW and low MW in this context are defined generally as follows:

High MW: $M_n > 50,000$

Low MW: $1,000 < M_n < 15,000$

As curing agents, sulfur and organic peroxide are included in the mixture preferably in the range of about 0.64-1.6 phr sulfur and about 0.6-1.2 phr organic peroxide, a more preferred range being about 0.8-1.28 phr sulfur and about 0.9-1.2 organic peroxide. For best results, it is felt that insoluble sulfur is preferred for use in preparing the mixture, however this is not considered critical and in the examples that follow, an evenly divided mixture of insoluble and rhombic sulfur were used successfully. Organic peroxides which are generally useful in the invention are those which can be described as having half lives less than about thirty minutes at 300° F. Typical peroxides which can be used are dicumyl peroxide, dialkyl peroxide, diaryl peroxide and peroxy ketals. Also, as is well known, sulfur donor accelerators such as mercaptobenzothiasole (MBTS) and diphenylguanidine (DPG) may be included in the mixture and are preferably included in the ranges of about 0.5-1.0 phr MBTS and 0.3-0.6 phr DPG.

In a particularly preferred form of the invention, the mixture comprises about 60% NR, about 33.4% of a high MW EPDM, about 6.6% of a low MW EPDM and, as curing agents, about 1.6 phr of sulfur, preferably insoluble sulfur, about 0.5 phr of mercaptobenzothiasole, about 0.4 phr diphenylguanidine and about 0.9 phr of an organic peroxide, preferably dicumyl peroxide.

EXAMPLE I

A series of five compounds were prepared according to the compositions shown in Table I. Mixing of the NR and EPDM was done using a laboratory size two roll mill with starting roll temperature about 80° F. High molecular weight (MW) EPDM was passed through the mill and the nip gap was adjusted so that it could form a band on the front roll. After the NR began to soften and the roll temperatures started to rise, high MW EPDM was blended with the NR. In accordance with good blend practice, this process was continued until a uniform NR and high MW EPDM blend was achieved prior to addition of the other blend ingredients such as low MW EPDM, zinc oxide, stearic acid and filler. The light process oil added at the end of the blending process to produce the NR/EPDM masterbatch used in the experiment. The compounded masterbatch was then allowed to cool to ambient temperature after which the curatives and accelerators were added.

TABLE I

| Ingredients | Sample Compounds | | | | |
|---|---|---|---|---|---|
| | A | B | C | D | E |
| Compound Masterbatch | | | | | |
| NR RSS#1[1] | 64 | 64 | 60 | 60 | 55 |
| EPDM 585 | 29 | 29 | 29 | 29 | 29 |
| TRILENE M/B[2] | 7 | 7 | 11 | 11 | 16 |
| ZnO M/B[3] | 7 | 7 | 7 | 4 | 4 |
| NULOK 321[4] | 20 | 20 | 20 | 20 | 20 |
| Whiting (CaCO$_3$) | 20 | 20 | 20 | 20 | 20 |
| Stearic acid | 2.37 | 2.37 | 2.37 | 2.37 | 2.37 |
| Lt process oil[5] | 4.0 | 4.0 | 4.0 | 4.0 | 4.0 |
| Curing Agents | | | | | |
| RHENOCURE[6] | 2.5 | 1.6 | 1.6 | 1.6 | 1.0 |
| MBTS[7] | 1.5 | 0.5 | 0.5 | 0.5 | 0.5 |
| DPG[8] | 0.2 | 0.4 | 0.4 | 0.4 | 0.6 |
| DICUP 40C[9] | — | 2.25 | 2.25 | 3.0 | 2.25 |

[1]Masticated to plasticity = 70
[2]60/40 Low MW EPDM (TRILENE 65)/High MW EPDM (ROYALENE 535) (Trademarks of Uniroyal, Inc.)
[3]60% active ZnO in a binder
[4]Aminosilane silicate (Trademark of J. M. Huber Co.)
[5]CIRCOSOL #410 (Trademark of Sun Oil Co.)
[6]Blend of 40/40 polymeric/rhombic sulfur in 20% binder (Trademark of Rhein-Chemie-Bayer, West Germany)
[7]Mercaptobenzothiasole disulfide
[8]Diphenylguanidine
[9]Dicumyl peroxide 40% active in CaCO$_3$ binder After compounding as described, sample compounds were then calendared into sheet form by passing it through rolls, following which the sheets were laid onto a tin plate, hand rolled and then vulcanized in an air autoclave at 300° F., 32 psig for one hour. The cured samples were then aged at room temperature for about 24 hours before being tested for ozone resistance and tensile properties, In addition, each of the samples were aged for 24 hours at 100° C. for further testing of tensile properties. The vulcanizates were evaluated for their tensile properties according to ASTM D-412-85 (die C) method and for their static ozone resistance in a controlled ozone chamber at 104° F., with 50 pphm ozone concentration.

Two separate ozone resistance test methods were employed. One test was the standard bent loop static test of ASTM D-1149-86 and the other was a more sever "folded twice"static test. In the more severe test, the sheet vulcanizate, about 0.050 in. thick, is folded twice and held with a clip during its exposure to ozone in order to more closely simulate the type of conditions that various thin rubber products, such as firemen's boots, would experience in actual use.

The results of the tests are shown in Table II.

TABLE II

| Test | Compound | | | | |
|---|---|---|---|---|---|
| | A | B | C | D | E |
| Tensile properties after aging for 24 hrs. at ambient temp.: | | | | | |
| Tensile strength (psi) | 750 | 1500 | 1200 | 1300 | 1050 |
| Elongation at break (%) | 500 | 600 | 600 | 600 | 580 |
| Tensile properties after aging for 24 hrs. at 100° C.: | | | | | |
| Tensile strength (psi) | 650 | 1500 | 1200 | 1300 | 1000 |
| Elongation at break (%) | 400 | 600 | 600 | 600 | 550 |
| Ozone resistance, 50 pphm, at 104° F.: | | | | | |
| Bent loop[1] | Pass | Pass | Pass | Pass | Pass |
| Folded twice sample | Fail | Fail | Pass | Pass | Pass |

[1]ASTM D-1149-86

From the test results, by comparing sample A (sulfur only) with the remaining samples B-E (sulfur and organic peroxide) it can be seen that adding the organic peroxide to the curing system significantly improved the tensile strength and elongation at break of the cured compound samples B-E over sample A. Sample B with a rubber blend of 64/36 NR/EPDM, although not able to pass the more severe "folded twice" ozone test did satisfactorily pass the bent loop test of ASTM D-1149-86 indicating satisfactory performance for many rubber product applications and shows that the sulfur/peroxide curing system provides a surprisingly successful result in achieving a successful co-cure of blends of NR/EPDM. The result is even more surprising when it is considered that cure was achieved in an air environment in which one would normally expect the peroxide to rapidly degrade without providing any curing effect of the EPDM.

Having established the successful co-cure of EPDM and NR with this process using sulfur and organic peroxide together, it is possible to increase the proportion of EPDM in the rubber blend to realize the benefit of improved ozone resistance provided by the increased amount of EPDM. This is shown in samples C-D where the ratio is 60/40 NR/EPDM and in sample E where the ratio is 55/45 NR/EPDM and in which all three test samples passed the sever "folded twice" test without exhibiting any significant loss of tensile strength.

EXAMPLE II

A further experiment was performed to determine the effect of decreasing the proportion of EPDM relative to NR. In this experiment, an NR/EPDM blend was prepared in the same manner as the blends used in Table I and subjected to the same tests. In addition, an antioxidant "Flectol H"(trademark of Goodyear Chemical Company) was added, the purpose of which was to provide protection of the natural rubber against aging in view of the relatively low level of EPDM used in this sample. Although antioxidants are generally considered to be detrimental to organic peroxides used as crosslinking curing agents, this particular antioxidant is believed to be one of the few which may be successfully used in this environment provided low levels are used, such as 1.0 phr or less. Antioxidant 2246 is another example of an antioxidant which may be used at low levels along with organic peroxide. The composition and test results are shown in Table II.

TABLE III

| Ingredients | Sample Compounds | |
|---|---|---|
| | Sulfur Cure | Sulfur/ Peroxide Cure |
| Masterbatch Compound | | |
| NR RSS #1 | 70 | 70 |
| EPDM 585 | 13.3 | 13.3 |
| TRILENE masterbatch[1] | 16.7 | 16.7 |
| ZnO | 4.2 | 4.2 |
| Whiting (CaCO$_3$) | 55 | 55 |
| Stearic Acid | 1.0 | 1.0 |
| Antioxidant "FLECTOL H" | 1.0 | 1.0 |
| Curing Agents | | |
| RHENOCURE | 1.5 | 1.6 |
| MBTS | 1.0 | 0.5 |
| DPG | 1.0 | 0.5 |
| DICUP 40C | — | 2.25 |
| Test Results | | |
| Tensile strength (psi) | 950 | 1350 |
| Elongation at break (%) | 500 | 650 |
| Ozone resistance | | |
| Bent loop | Pass | Fail |
| Folded twice sample | Fail | Fail |

[1]Same as in Table I.

As can be seen from these comparative tests, a significant improvement in ultimate properties was realized in the sulfur/peroxide cured sample with higher tensile strength and elongation at break than in the sulfur-only cured sample. This would indicate a significant improvement in the cocurability of the NR and EPDM phases. On the other hand, the increase in tensile properties was accomplished by a decrease in ozone resistance as shown by cracks developed in the sulfur/peroxide cured sample exposed to ozone enviornment at 104° F., 50 pphm in the bent loop test. This is believed to result from the fact that the EPDM phase is presumably relatively uncured since sulfur cures NR much more favorably. However, there are numerous products that can take advantage of the improved tensile properties of the sulfer/peroxide cured blend in which ozone resistance is not as critical a factor. Examples would be rubber belts and "under the hood applications" where the improved tensile properties would be important but the ozone exposure would be relatively minor.

What is claimed is:

1. An air-cured ozone resistant composition comprising a cured mixture containing by weight of total rubber, a range of about 70-55 parts natural rubber (NR) and about 30-45 parts of an ethylene propylene diene monomer elastomer (EPDM), said EPDM being divided between high molecular weight (MW) EPDM and low molecular weight (Mw) EPDM in the range of about 32-20 parts high NW and about 4-10 parts low MW EPDM, said high MW being defined as having an MN>50,000 and said low MN being defined as having an MN between 1,000 and 15,000; and, as curing agents, a range of about 0.64-1.6 phr of sulfur, about 0.5-1.0 phr of mercaptobenzothiasole disulfide, about 0.3-0.6 phr of diphenylquanidine and about 0.6-1.2 phr of organic peroxide.

2. The composition of claim 1, wherein the NR content is in the range of about 64-55% and the EPDM content is in the range of about 36-45%, and the curing agents are in the range of about 0.8-1.28 phr for sulfur, about 0.9-1.2 phr for the organic peroxide, about 0.4-0.6 phr for the DPG, and the MBTS content is about 0.5 phr.

3. The composition of claim 1, wherein the rubber blend is 60/40 NR/EPDM and the curing agents consist essentially of about 1.28 phr sulfur, 0.5 phr MBTS, 0.4 phr DPG and 0.9 phr organic peroxide.

4. The composition of claim 1, wherein the rubber blend is about 64/36 NR/EPDM and the EPDM is divided into about 31.2 parts of a high MW EPDM and about 4.2 parts of a low MW EPDM.

5. The composition of claim 3, wherein the EPDM is divided into about 33.4 parts of a high MW EPDM and about 6.6 parts of a low MW EPDM.

6. The composition of claim 1 where in the sulfur comprises an insoluble sulfur.

7. The composition of claim 1 wherein the sulfur consists essentially of an evenly divided composition of insoluble and rhombic sulfur.

8. The composition of claim 1 wherein the peroxide consists essentially of dicumyl peroxide.

* * * * *